United States Patent
Anderson et al.

(10) Patent No.: US 11,194,633 B2
(45) Date of Patent: Dec. 7, 2021

(54) COHERENT CLONING OF ACTIVE COMPUTE NODES

(71) Applicant: International Business Machines Corporation, Armonk, NY (US)

(72) Inventors: Mark J. Anderson, Oronoco, MN (US); Thomas P. Giordano, Rochester, MN (US); Scott D. Helt, Rochester, MN (US); David Jones, Rochester, MN (US); Curtis D. Schemmel, Rochester, MN (US); Shauna Rollings, Rochester, MN (US); Yun Wang, Beijing (CN); Jennifer A. Dervin, Rochester, MN (US); Kristopher C. Whitney, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 195 days.

(21) Appl. No.: 16/561,875

(22) Filed: Sep. 5, 2019

(65) Prior Publication Data
US 2021/0073044 A1 Mar. 11, 2021

(51) Int. Cl.
*G06F 9/50* (2006.01)

(52) U.S. Cl.
CPC ........ *G06F 9/5077* (2013.01); *G06F 2201/84* (2013.01)

(58) Field of Classification Search
CPC .. G06F 2201/84; G06F 3/065; G06F 11/1446; G06F 11/2082; G06F 2201/835; G06F 2201/865; G06F 2211/1035; G06F 9/5077
See application file for complete search history.

(56) References Cited

U.S. PATENT DOCUMENTS

| | | | |
|---|---|---|---|
| 7,536,525 B2 | 5/2009 | Chandrasekaran et al. | |
| 8,151,263 B1 | 4/2012 | Venkitachalam et al. | |
| 10,152,251 B2 | 12/2018 | Sancheti et al. | |
| 10,198,377 B2 | 2/2019 | Wilson et al. | |
| 10,761,941 B1* | 9/2020 | Redko | G06F 3/065 |
| 2006/0101189 A1 | 5/2006 | Chandrasekaran et al. | |
| 2015/0067390 A1* | 3/2015 | Blake | G06F 9/45558 714/15 |
| 2016/0378527 A1 | 12/2016 | Zamir | |
| 2017/0116207 A1* | 4/2017 | Lee | G06F 16/27 |
| 2017/0286228 A1* | 10/2017 | Redko | G06F 11/1446 |
| 2018/0032272 A1* | 2/2018 | Sato | G06F 12/0638 |
| 2019/0155699 A1 | 5/2019 | Luo et al. | |

FOREIGN PATENT DOCUMENTS

CA    2746416 A1    6/2010

* cited by examiner

*Primary Examiner* — Dong U Kim
(74) *Attorney, Agent, or Firm* — Patterson + Sheridan, LLP

(57) ABSTRACT

Techniques for warm cloning of computing nodes are provided. A request to clone a first computing node is received. Upon determining that a first transaction of a plurality of transactions is ongoing, a first moment in time when data associated with the first transaction was coherent on the first computing node is identified. Tracking data related to the first transaction is collected, beginning at the first moment in time. Further, a first storage associated with the first computing node is copied to a second storage associated with a second computing node, where the first transaction continues during the copying. The tracking data related to the first transaction is then transmitted to the second computing node.

20 Claims, 6 Drawing Sheets

COHERENT CLONING OF ACTIVE COMPUTE NODES

BACKGROUND

The present disclosure relates to computing nodes, and more specifically, to cloning active computing nodes without losing data coherency.

In order to provide fault recovery in computing systems, nodes (e.g., virtual machines) are often cloned to one or more other nodes, to provide an identical copy. In this way, if the first node fails, the secondary node(s) can take over. In existing systems, the storage of the node is cloned via snapshot, while anything remaining in memory is lost. Typically, the solution is to force everything in memory to disk prior to performing the snapshot. This can be problematic because it forces the node to cease processing during the snapshot, in order to ensure coherency. That is, transactions cannot continue to be processed during the clone, because the secondary nodes would not be coherent or consistent with the first node. In addition to stopping all executing transactions, existing systems flush the entire memory to disk, which is inefficient.

For example, U.S. Pat. No. 8,151,263 to Venkitachalam et. al. describes techniques to clone virtual machines by "quiesceing the virtual machine, taking a snapshot S1 (excluding main memory) of the state of the virtual machine, and creating a copy S2 of the snapshot S1." Abstract. Similarly, U.S. Pat. No. 7,536,525 to Chandrasekaran et. al. involves cloning systems by "freezing writes to a storage file," "freezing writes to a memory content," and "unfreezing the memory content" once the copy is completed. Abstract. These existing solutions are interruptive and time-consuming, and prevent efficient creation of cloned nodes.

SUMMARY

According to one embodiment of the present disclosure, a method is provided. The method includes receiving a request to clone a first computing node. Upon determining that a first transaction of a plurality of transactions is ongoing, the method includes identifying a first moment in time when data associated with the first transaction was coherent on the first computing node, and collecting tracking data related to the first transaction, beginning at the first moment in time. The method further includes copying a first storage associated with the first computing node to a second storage associated with a second computing node, wherein the first transaction continues during the copying. The method also includes transmitting, to the second computing node, the tracking data related to the first transaction. One advantage provided by the method is the ability to clone active computing nodes.

According another embodiment of the present disclosure, the method further includes, upon determining that a second transaction of the plurality of transactions has completed and prior to copying the first storage, transferring data associated with the second transaction to the first storage. One advantage offered by this embodiment is that completed transactions are made coherent in storage to reduce the needed tracking data.

According to some embodiments of the present disclosure, the method additionally includes, upon determining that the second transaction has completed and prior to copying the first storage, clearing tracking data related to the second transaction. Such an embodiment advantageously reduces the tracking data that is collected, which thereby reduces the needed computing resources to complete the clone.

According to yet another embodiment of the present disclosure, identifying the first moment in time when data associated with the first transaction was coherent on the first computing node comprises identifying a moment in time when the first transaction began. Advantageously, this enables the tracking to be collected beginning at a known and stable point in the system.

According to another embodiment of the present disclosure, identifying the first moment in time when data associated with the first transaction was coherent on the first computing node comprises identifying a most recent moment in time when data associated with the first transaction was committed to the first storage. On advantage offered by such an embodiment is that the transaction can be tracked from a relatively more-recent time, which can avoid the need to repeat one or more operations that were performed during the transaction processing, if those changes are already coherent.

According to some embodiments of the present disclosure, the second computing node initializes using the copy of the first storage, identifies one or more incoherent transactions in the copy of the first storage, wherein the one or more incoherent transactions include the first transaction, and rolls back the first transaction on the second computing node. An advantage of these embodiments is that the second computing node can intelligently identify transactions needing further processing, and selectively rolls back such transactions to synchronize the nodes with minimal resources used.

According to yet another embodiment of the present disclosure, upon receiving the tracking data related to the first transaction, the second computing node further performs the first transaction using the received tracking data. Advantageously, this allows the second node to become synchronized with the first node, without requiring the first node to pause any operations.

According to still another embodiment of the present disclosure, a computer-readable storage medium is provided. The computer-readable storage medium has computer-readable program code embodied therewith, the computer-readable program code executable by one or more computer processors to perform an operation. The operation includes receiving a request to clone a first computing node. Upon determining that a first transaction of a plurality of transactions is ongoing, the operation includes identifying a first moment in time when data associated with the first transaction was coherent on the first computing node, and collecting tracking data related to the first transaction, beginning at the first moment in time. The operation further includes copying a first storage associated with the first computing node to a second storage associated with a second computing node, wherein the first transaction continues during the copying. The operation also includes transmitting, to the second computing node, the tracking data related to the first transaction. One advantage provided by the computer-readable storage medium is the ability to clone active computing nodes.

According to yet another embodiment of the present disclosure, a system is provided. The system includes one or more computer processors, and a memory containing a program which, when executed by the one or more computer processors, performs an operation. The operation includes receiving a request to clone a first computing node. Upon determining that a first transaction of a plurality of transactions is ongoing, the operation includes identifying a first moment in time when data associated with the first transaction was coherent on the first computing node, and collecting tracking data related to the first transaction, beginning at the first moment in time. The operation further includes copying a first storage associated with the first computing node to a second storage associated with a second computing node, wherein the first transaction continues during the copying. The operation also includes transmitting, to the second computing node, the tracking data related to the first transaction. One advantage provided by the system is the ability to clone active computing nodes.

DETAILED DESCRIPTION

Figure 1:
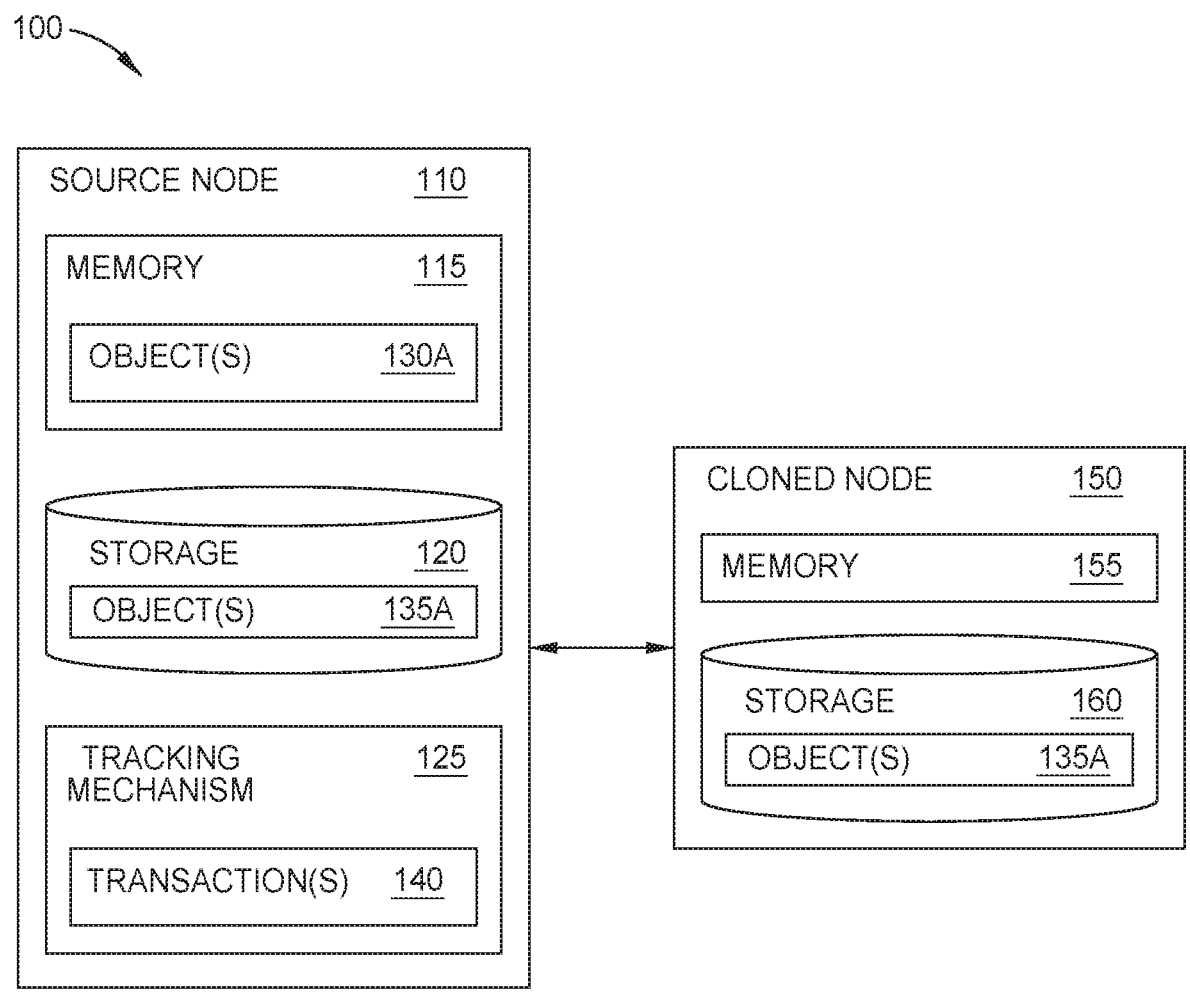
FIG. 1 illustrates a system including computing nodes configured to perform warm cloning of active nodes, according to one embodiment disclosed herein.

Embodiments of the present disclosure provide techniques to efficiently clone active nodes, without losing data consistency or coherency. In embodiments, the cloned computing nodes can include virtual machines (VMs), physical devices, and the like. Notably, in embodiments of the present disclosure, techniques are disclosed to allow the node to be cloned while it is active or running (e.g., while transactions are still being processed), without losing processes or data that are still in memory. Additionally, in some embodiments, rather than flush the entire memory to disk, each transaction is handled intelligently to determine its status and proceed accordingly.

In an embodiment, transaction tracking functionality is used to enable warm cloning. In one embodiment, the system will first clears the tracking list by removing data that has been completed to disk, and begins intelligent transaction tracking of ongoing operations, as discussed in more detail below. The system can then flush parts of memory to disk, in order to ensure the identified completed transactions, and/or operating system (OS) operations, are on disk. In an embodiment, the node then performs the clone/snapshot of the storage of the node. Notably, during this process, transactions can still be processed by the node. In an embodiment, when the cloned node comes online, there may therefore be transactions that are not coherent, because of data that was still in memory on the source node (e.g., for transactions or OS operations that are in flight during the snapshot). In some embodiments of the present disclosure, the cloned node rolls back these incomplete or incoherent operations. The tracking mechanism can then use the tracking data to reapply the tracked transactions that were occurring during the clone, in order to bring the systems into sync.

In one embodiment, the system is configured to identify and utilize specific tracking points, depending on the state of a given transaction. That is, in an embodiment, the system does not simply track all changes during the clone. Instead, embodiments of the present disclosure use a granular and transaction-specific tracking, at the operation level. In some embodiments, tracking of a given transaction can be rolled back to the start point (or to another identified other prior point in time), even while the operations/transaction continue normally. That is, the operation itself is performed normally on the source node, but tracking is begun at a prior point. In an embodiment, because these pending transactions will be rolled back on the cloned node, this tracking data (beginning at the identified tracking point) can be used to synchronize the nodes.

In some embodiments, the system identifies, for each ongoing transaction, the points where data was committed to disk. These points can then be used as the tracking start point. That is, everything that has been committed to disk will be copied successfully in the clone, so the system need not track things that occurred prior to this commit. However, things after the commit may be lost, so this most recent coherency point can be used as the tracking point for the transaction. This avoids unnecessary duplication of efforts, and reduces the time and resources required to synchronize the nodes. In an embodiment, once the cloned node is online, the systems are connected and resynced by completing these pending transactions, using the tracking data, on the cloned node. This allows a coherent clone to be made without pausing operations on the source node, without losing data in memory, and without naively copying all of memory.

FIG. 1 illustrates a system 100 including computing nodes configured to perform warm cloning of active nodes, according to one embodiment disclosed herein. As illustrated, the System 100 includes a Source Node 110 and a Cloned Node 150. In an embodiment, both the Source Node 110 and Cloned Node 150 are computing nodes in the system 100, and may have identical or similar architecture (e.g., a memory, storage, tracking mechanism, and one or more applications to perform work). In an embodiment, the Source Node 110 is the node being cloned, while the Cloned Node 150 is the resulting clone. Of course, in embodiments, any computing node may act as the source node or target node for a given clone, and the naming/designations utilized herein are included for conceptual clarity.

In an embodiment, the cloning process generally includes copying the storage of the source node, and using this snapshot to start up a cloned node. As illustrated, the Source Node 110 includes a Memory 115 with one or more Objects 130A, a Storage 120 with one or more Objects 135A, and a Tracking Mechanism 125 that is tracking one or more Transactions 140. In one embodiment, the Objects 130A in Memory 115 correspond to any data relating to processes or operations (e.g., Transactions 140) that are currently ongoing or in-flight. In embodiments, these can be client transactions, operating system (OS) operations, and the like. Further, the Objects 135A in Storage 120 correspond to data that has been committed or written to disk (e.g., at a predefined point in a transaction, after an operation or transaction has completed, and the like).

Although depicted as a discrete component, in embodiments, the Tracking Mechanism 125 may be implemented using software (e.g., in Memory 115), hardware, or a combination of hardware and software. In an embodiment, the Tracking Mechanism 125 generally monitors execution of ongoing operation on the Source Node 110 (e.g., Transactions 140). In an embodiment, each Transaction 140 generally corresponds to a processing operation or task, such as processing client requests, updating data records, and the like. In one embodiment, the Tracking Mechanism 125 monitors each Transaction 140 as it progresses from start to completion. In some embodiments, the Tracking Mechanism 125 maintains records relating to each Transaction 140, including data such as the current stage of the Transaction 140, pointers or other identifiers of the relevant data for the transaction (e.g., the Object(s) 130A in Memory 115, and/or the Object(s) 135A in Storage 120), and the like.

As illustrated, the cloning process includes creating a snapshot or copy of the Objects 135A in Storage 120 of the Source Node 110, and using this storage snapshot to start the Cloned Node 150. Specifically, the Storage 160 of the Cloned Node 150 includes a copy of each of the Objects 135A. Notably, in embodiments, data relating to ongoing transactions (e.g., the Objects 130A in Memory 115) are not included in the cloning process. That is, as illustrated, the Cloned Node 150 does not have copies of the Objects 130A that were in Memory 115 at the time of the clone. In some embodiments, these Objects 130A and Transactions 140 are referred to as pending, volatile, ongoing, in-flight, and the like.

In existing systems, to perform the cloning process, all ongoing Transactions 140 are paused or completed, and all Objects 130A in Memory 115 are flushed to Storage 120. Cloning this Storage 120 then allows the Cloned Node 150 to startup in an identical state to the Source Node 110. However, this process requires all operations on the Source Node 110 to cease, which is inefficient. In embodiments of the present disclosure, the Storage 120 is copied while ongoing Transactions 140 continue processing in memory 115. Thus, when the Cloned Node 150 is activated, it may have incoherent or inconsistent data, as it lacks the data relating to the Objects 130A that were still in Memory 115 being processed. In one embodiment, the Tracking Mechanism 125 tracks these ongoing operations, and transmits this tracking data to the Cloned Node 150. The Cloned Node 150 can then use the tracking data to synchronize with the Source Node 110.

Figure 2:
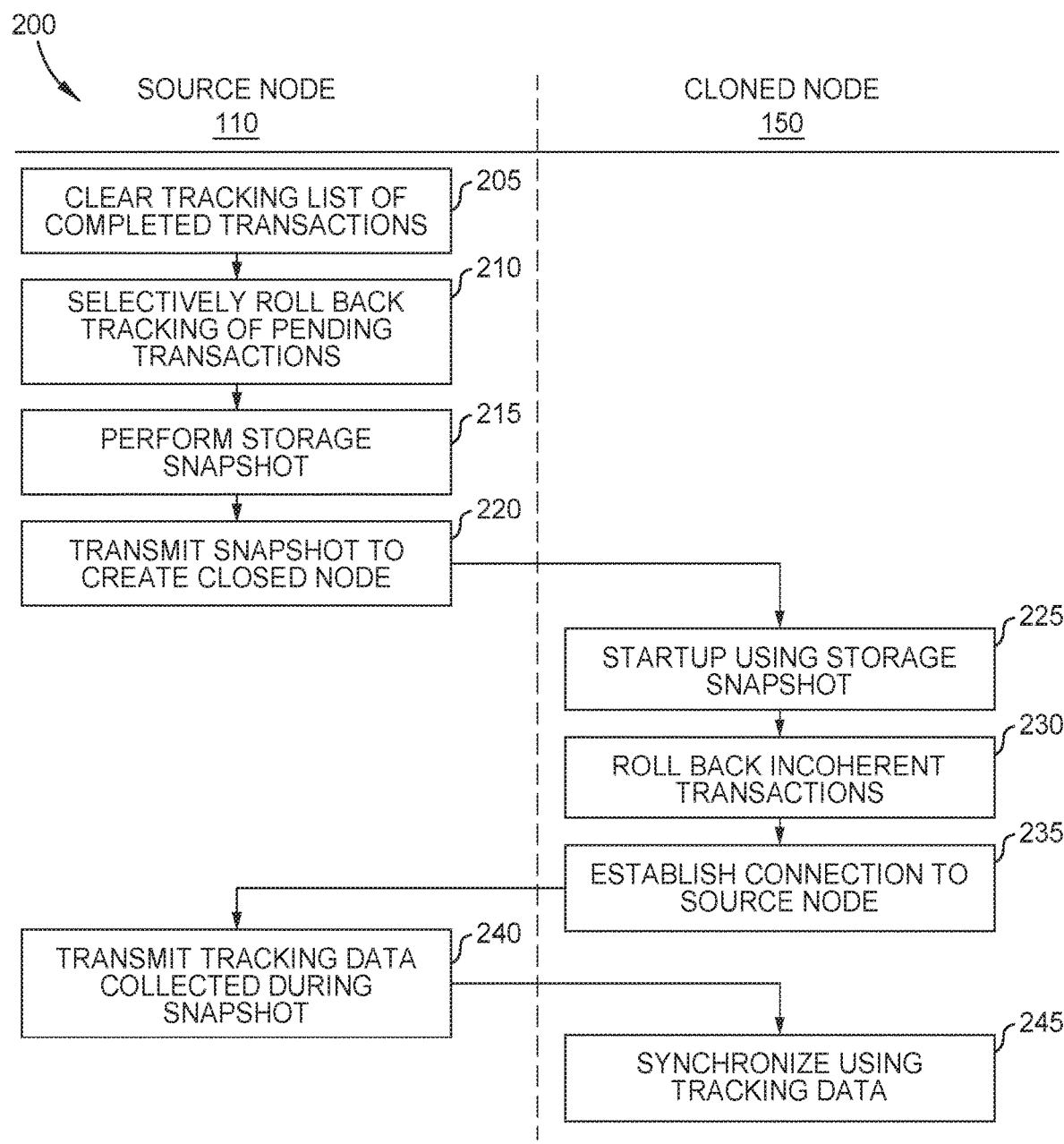
FIG. 2 illustrates a workflow for coherent cloning of an active computing node, according to one embodiment disclosed herein.

FIG. 2 illustrates a workflow 200 for coherent cloning of an active computing node, according to one embodiment disclosed herein. In the illustrated workflow 200, a series of operations are performed on the Source Node 110 and on the Cloned Node 150. Although not included in the depicted embodiment, in some embodiments, one or more other nodes may be involved in the cloning process (e.g., a node that monitors the work nodes, a user interface, and the like). As illustrated, the workflow 200 begins at block 205. At block 205, upon receiving a request or instruction to generate a snapshot (e.g., a request to create a clone), the Source Node 110 clears its tracking list of data relating to completed transactions.

In an embodiment, as discussed above, the Tracking Mechanism 125 of the Source Node 110 maintains records relating to Transactions 140 on the node. In some embodiments, this list includes an indication as to the stage of each Transaction 140, and/or data relating to the Transaction 140. For example, the tracking data can include an indication as to whether the Transaction 140 is ongoing, completed, or not yet begun, as well as which objects, if any, have been written to storage. In an embodiment, clearing the tracking list of completed transactions includes deleting, clearing, or otherwise removing or ignoring any tracking data that corresponds to transactions which have completed, with or without writing data to storage. In some embodiments, block 205 includes clearing tracking data relating to objects which have been committed to storage, even if the corresponding transaction is still ongoing with respect to one or more other objects.

Once the tracking list has been cleared of these completed transactions (e.g., stored objects), the workflow 200 proceeds to block 210, where the Source Node 110 selectively rolls back tracking of any pending or ongoing transactions. In an embodiment, block 210 includes determining, for each ongoing transaction, a point where data associated with the transaction was coherent or consistent. That is, in one embodiment, the Source Node 110 evaluates the tracking data for each pending transaction in order to identify places or points in the operations where the relevant data was in storage (e.g., either yet to be copied to memory, or having just been committed to storage). In one embodiment, a transaction is considered "coherent" if the Source Node 110 (or another computing node) could begin or continue the transaction without any requiring data that is in memory on the Source Node 110.

In one embodiment, a transaction is "coherent" at its beginning, as no data for the transaction has yet been copied or operated on in memory. In some embodiments, some transactions may also have coherent points during processing, such as points where the relevant data is committed to storage. In one embodiment, at block 210, the Source Node 110 identifies the most recent coherent point for each ongoing transaction. In another embodiment, the Source Node 110 identifies the start or beginning of the transactions. This identified point is referred to herein as the "tracking point" for a given transaction. In the illustrated embodiment, the Source Node 110 "rolls back" tracking for each transaction to the identified tracking point for the transaction.

In one embodiment, rolling back tracking includes flagging this point in the tracking data as the "start" for the Cloned Node 150, as discussed in more detail below. In some embodiments, tracking data from prior to the tracking point is cleared or deleted. Notably, in an embodiment, the transaction can continue processing normally, and is not rolled back or otherwise stopped. The Tracking Mechanism 125 of the Source Node 110 collects or maintains the tracking data beginning at the tracking point, and continuing through the clone process. Once each tracking has been intelligently and selectively rolled back for each ongoing transaction, the Source Node 110 performs a snapshot of its storage. In an embodiment, this includes creating a copy of each Object 135A in storage. At block 220, the Source Node 110 transmits this snapshot to the Cloned Node 150.

At block 225, the Cloned Node 150 uses this snapshot to activate or initialize. That is, the Cloned Node 150 starts up with an identical copy of the Storage 120 of the Source Node 110. The workflow 200 then proceeds to block 230, where the Cloned Node 150 rolls back any incoherent transactions or data in its copied storage. For example, the Cloned Node 150 can identify any objects in its storage that are related to or depend on data that was in memory of the Source Node 110 when the copy was made. In some embodiments, the Cloned Node 150 does so using tracking data received along with the snapshot from the Source Node 110. In another embodiment, each object or data structure in the storage includes a flag or other indicator as to whether it is coherent (e.g., complete and stable without data in memory or other volatile location) or incoherent (e.g., dependent on such data).

In some embodiments, this process is similar to one used by computing nodes if the node crashes or otherwise fails during processing. That is, if a node fails during operations, data in memory will be lost, while data in storage is typically maintained. In one embodiment, upon starting up, the node utilizes its tracking data to determine which transactions and/or objects in storage, if any, are incoherent because of the data lost from memory. In the illustrated embodiment, the Cloned Node 150 rolls back these incoherent transactions/objects to the most recent stable or coherent point for the transaction (such as the starting point of the transaction). That is, the Cloned Node 150 undoes any changes that were made to the object(s) in storage during processing beginning at the last coherent point. In some embodiments, this includes replacing the object(s) with a prior version of the object(s) that corresponds to the prior coherent point.

The workflow 200 then proceeds to block 235, where the Cloned Node 150 establishes a communication link with the Source Node 110. At block 240, the Source Node 110 then transmits, to the Cloned Node 150, the collected tracking data related to ongoing transactions. As discussed above, during the cloning process, the Source Node 110 continues to process transactions normally. In an embodiment, while the snapshot is taken and the Cloned Node 150 starts up/rolls back the incoherent data, the Source Node 110 therefore continues to maintain tracking data about the ongoing operations. At block 240, the Source Node 110 transmits this tracking data to the Cloned Node 150. At block 245, the Cloned Node 150 then uses this updated tracking data to synchronize with the Source Node 110.

The workflow 200 therefore enables warm or hot cloning of the Source Node 110 (e.g., cloning without pausing operations on the Source Node 110). In an embodiment, the intelligent tracking of each transaction enables the Cloned Node 150 to be synchronized with the Source Node 110 without simply recording all data changes that occurred during the snapshot. This reduces the resources required to complete the synchronization, and improves the latency involved in the cloning process.

Figure 3:
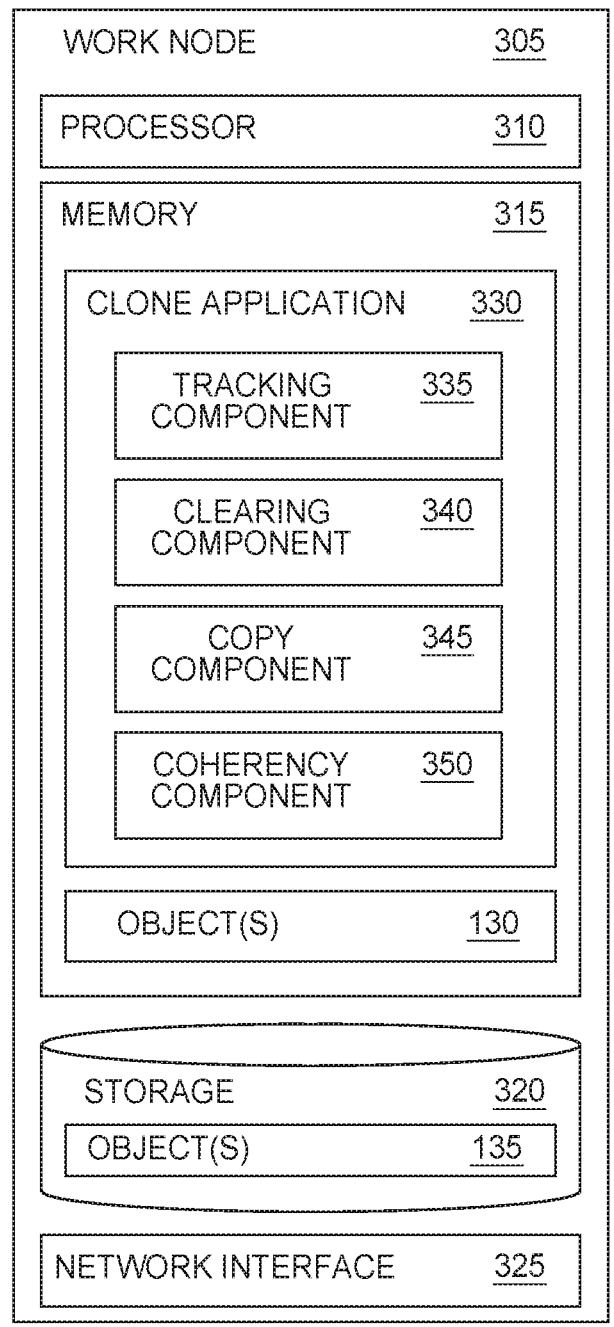
FIG. 3 is a block diagram depicting a work node configured to perform warm cloning, according to one embodiment disclosed herein.

FIG. 3 is a block diagram depicting a Work Node 305 configured to perform warm cloning, according to one embodiment disclosed herein. In the illustrated embodiment, the Work Node 305 may be a Source Node 110 or a Cloned Node 150, depending on the particular role it plays in the cloning process. As illustrated, the Work Node 305 includes a Processor 310, Memory 315, Storage 2320, and a Network Interface 325. In the illustrated embodiment, the Processor 310 retrieves and executes programming instructions stored in Memory 315, as well as stores and retrieves application data residing in Storage 320. The Processor 310 is generally representative of a single CPU, multiple CPUs, a single CPU having multiple processing cores, and the like. The Memory 315 is generally included to be representative of a random access memory. Storage 320 may be disk drives or flash-based storage devices, and may include fixed and/or removable storage devices, such as fixed disk drives, removable memory cards, or optical storage, network attached storage (NAS), or storage area network (SAN). Via the Network Interface 325, the Work Node 305 can be communicatively coupled with one or more other devices and components, such as other work nodes, monitoring nodes, storage nodes, and the like.

Although depicted as a physical device in the illustrated embodiment, in embodiments, the Work Node 305 may be implemented using hardware, software, or a combination of hardware and software. For example, in one embodiment, the Work Node 305 is a virtual machine. As illustrated, the Storage 320 associated with or corresponding to the Work Node 305 includes one or more Objects 135, while the corresponding Memory 315 includes a set of one or more Objects 130. Generally, the Objects 135 in Storage 320 are representative of data residing in a non-volatile manner, while Objects 130 in Memory 315 are representative of data residing in a volatile manner.

In the illustrated embodiment, the Memory 315 further includes a Clone Application 330. Although depicted as software residing in Memory 315, in embodiments, the functionality of the Clone Application 330 may be implemented using software, hardware, or a combination of software and hardware. As illustrated, the Clone Application 330 includes a Tracking Component 335, a Clearing Component 340, a Copy Component 345, and a Coherency Component 350. Although depicted as discrete components for conceptual clarity, in embodiments, the operations of the Tracking Component 335, Clearing Component 340, Copy Component 345, and Coherency Component 350 may be combined or distributed across any number of components.

In an embodiment, the Tracking Component 335 monitors ongoing transactions and operations on the Work Node 305, and maintains a set of one or more records for each such transaction. In embodiments, the records can include, for example, indications of one or more Objects 130 and/or 135 in Memory 315 or Storage 320 that are related or relevant to the transaction. In some embodiments, the tracking data further indicates, for each relevant Object 135 in Storage 320, whether or not the object is coherent. In one embodiment, the Tracking Component 335 similarly maintains data about the current stage of each transaction (e.g., completed, ongoing, waiting to begin, and the like). In embodiments, as transactions are processed, the Tracking Component 335 maintains this tracking data to reflect the current state of each transaction/object.

In the illustrated embodiment, the Clearing Component 340 can evaluate the tracking data periodically or on request to clear out completed data. For example, when a clone is requested, the Clearing Component 340 can parse the tracking data to identify transactions (or portions of transactions) that have completed. In an embodiment, the Clearing Component 340 then clears the data related to completed tasks from the tracking list. In some embodiments, the Clearing Component 340 copies this tracking data to Storage 320, in case it is needed subsequently. In one embodiment, the Clearing Component 340 also ensures that the corresponding objects were written to Storage 320, and flushes them to storage if needed.

In an embodiment, the Copy Component 345 generates snapshots of the Storage 320 periodically or upon request. For example, in an embodiment, when a clone of the Work Node 305 is requested, the Copy Component 345 can perform the snapshot at the appropriate time. In some embodiments, if the Work Node 305 is acting as the cloned node, the Copy Component 345 uses the received snapshot to populate the Storage 320 with Objects 135, and starts up or otherwise activates the Work Node 305.

In the illustrated embodiment, the Coherency Component 350 is used to evaluate and ensure the coherency of data in Storage 320 periodically or upon request. In one embodiment, upon starting up, the Coherency Component 350 evaluates the Objects 135 (or any associated tracking data) to identify data that is inconsistent or incoherent. As discussed above, in one embodiment, data is considered "coherent" if it is not dependent on data residing in Memory 315 or another volatile location, while data is "incoherent" if it is dependent on such data. That is, in an embodiment, data that would need to be rolled back or otherwise operated on in the event of a system crash is considered "incoherent,"

while data that is "stable" and would not need remedial actions is considered "coherent."

In one embodiment, when the Coherency Component 350 identifies incoherent Objects 135 in Storage 320, it rolls back the corresponding transaction(s) to an identified tracking point (e.g., the beginning of the transaction, or a most-recent stable point in the transaction). The Coherency Component 350 can then re-perform the transaction. In one embodiment, this includes using tracking data received from the source node to synchronize the data with the source node. In another embodiment, if no such data is available (e.g., because the Work Node 305 is the source node), the Work Node 305 may attempt the transaction again, or may request user-intervention.

Figure 4:
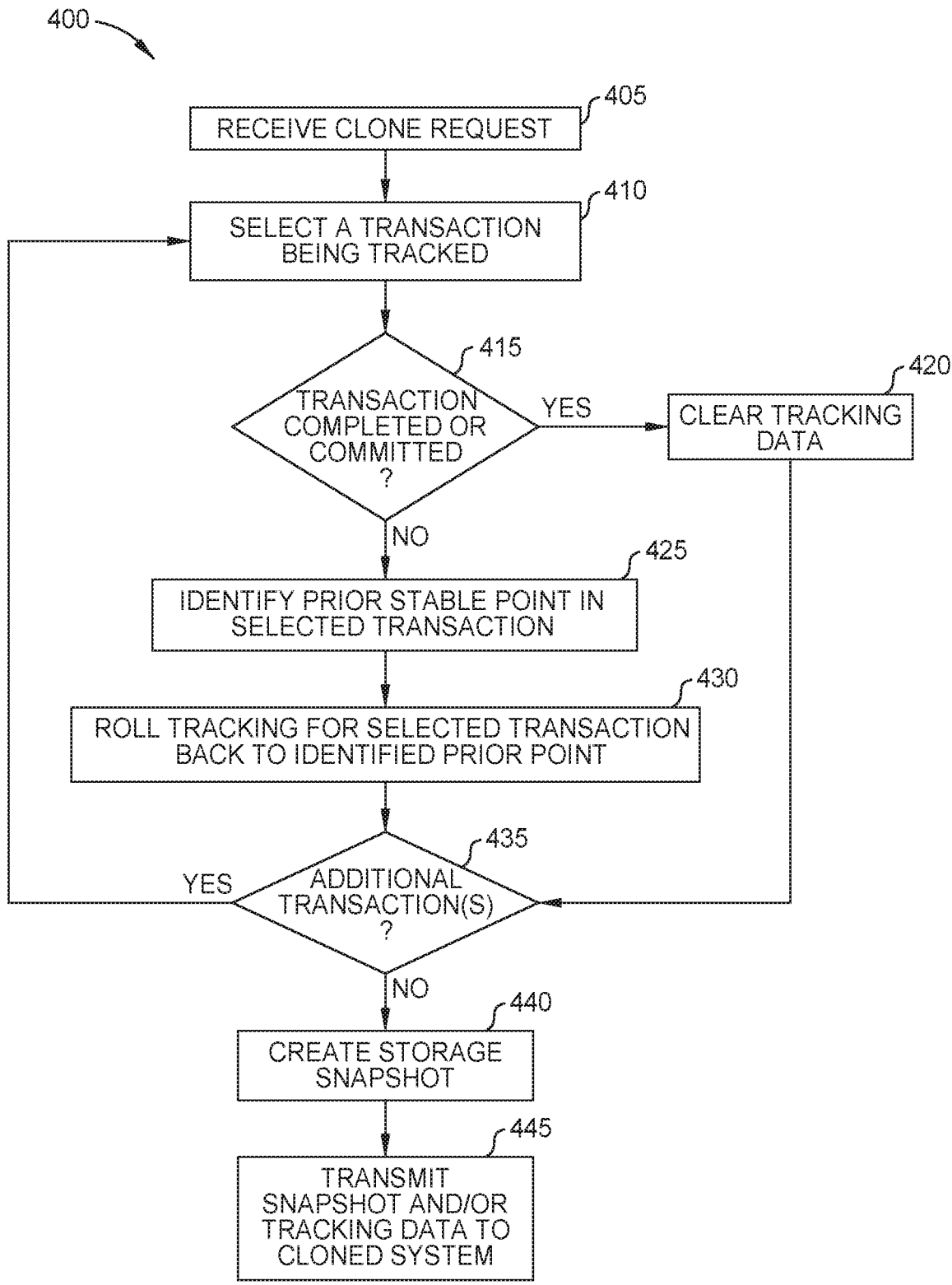
FIG. 4 is a flow diagram illustrating a method of cloning an active compute node while maintaining data consistency, according to one embodiment disclosed herein.

FIG. 4 is a flow diagram illustrating a method 400 of cloning an active compute node while maintaining data consistency, according to one embodiment disclosed herein. The method 400 begins at block 405, where a Work Node 305 receives a request to generate a clone of itself. At block 410, the Work Node 305 accesses its tracking data, and selects one of the transactions that are currently being tracked. In an embodiment, the tracking data can include tracking information for completed transactions, ongoing transactions, and/or un-started transactions. The method 400 then proceeds to block 415, where the Work Node 305 determines whether the transaction has completed or whether the relevant data (e.g., the objects) for the transaction have otherwise been committed to storage. If so, the method 400 proceeds to block 420, where the Work Node 305 clears the tracking data associated with the selected transaction. The method 400 then continues to block 435, discussed in more detail below.

Returning to block 415, if the Work Node 305 determines that the selected transaction has not been completed or otherwise committed to storage (e.g., that the transaction is undergoing processing), the method 400 proceeds to block 425, where the Work Node 305 identifies one or more prior stable points in the transaction. This identified point is used as the tracking point for the selected transaction. In one embodiment, as discussed above, this involves identifying the start point of the transaction. In another embodiment, the Work Node 305 identifies point(s) in the transaction when all relevant data was stable (e.g., committed to storage), and uses the most recent of these points as the tracking point.

The method 400 then proceeds to block 430, where the Work Node 305 rolls back tracking for the selected transaction to this identified prior tracking point. In one embodiment, this includes maintaining tracking data related to the transaction that has been collected since the tracking point occurred. In embodiments, although the tracking data is "rolled back," the transaction itself continues processing, and the underlying data or objects are not affected. The method 400 then continues to block 435, where the Work Node 305 determines whether there is at least one additional transaction reflected in the tracking data. If so, the method 400 returns to block 410. Otherwise, the method 400 proceeds to block 440.

At block 440, the Work Node 305 creates a snapshot of its storage. That is, the Work Node 305 copies all objects residing in its storage. The method 400 then continues to block 445, where the Work Node 305 transmits this snapshot to the cloned node (or to a third node acting as intermediary for the clone). This snapshot is then used to activate or start up the cloned node. In some embodiments, the Work Node 305 further transmits its current tracking data. In one embodiment, upon receiving a request from the cloned node (e.g., once it is online and has rolled back the incoherent data), the Work Node 305 similarly transmits the relevant tracking data to the cloned node.

Figure 5:
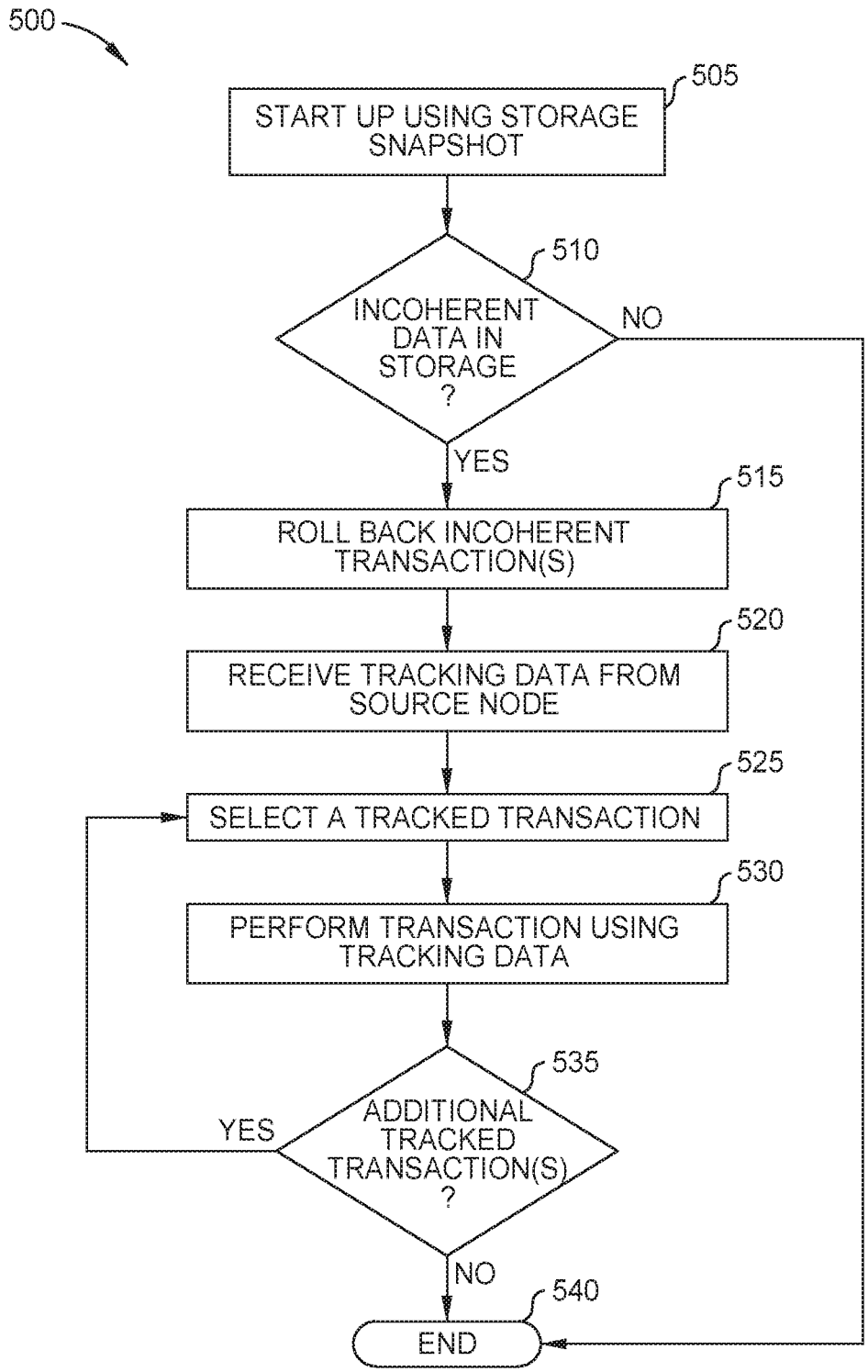
FIG. 5 is a flow diagram illustrating a method of starting up a cloned node while maintaining data consistency, according to one embodiment disclosed herein.

FIG. 5 is a flow diagram illustrating a method 500 of starting up a cloned node while maintaining data consistency, according to one embodiment disclosed herein. The method 500 begins at block 505, where a Work Node 305 starts up with the data included in a snapshot as its storage. At block 510, the Work Node 305 determines whether there is any incoherent or inconsistent data in its storage. In one embodiment, this includes checking a flag or other indicator included with each object or other data structure in storage. In another embodiment, the Work Node 305 analyzes received tracking data for each object, to determine whether it is coherent or not. If all the objects in storage are coherent, the method 500 terminates at block 540.

Returning to block 510, if at least one object in storage is identified as not coherent, the method 500 proceeds to block 515, where the Work Node 305 identifies the corresponding transaction(s) for each such object, and rolls back these incoherent transactions. In one embodiment, this includes undoing any changes or modifications to the objects in storage, until a prior tracking point is reached (e.g., a prior stable point in the transaction, or the beginning of the transaction). In another embodiment, the Work Node 305 retrieves a copy of the object at the prior stable point (e.g., from the tracking data) and replaces the copy of the object residing in storage.

At block 520, the Work Node 305 receives updated tracking data from the source node. In one embodiment, the Work Node 305 requests tracking data for the incoherent transactions it identified. In another embodiment, the Work Node 305 simply requests any updated tracking data (e.g., data relating to any transaction that was ongoing during the snapshot process). The method 500 then proceeds to block 525, where the Work Node 305 selects one of the tracked transactions in the received updated tracking data. At block 530, the Work Node 305 uses the tracking data to perform the transaction or otherwise synchronize the stored object(s) with the corresponding objects on the source node. At block 535, the Work Node 305 determines whether there is at least one more ongoing transaction that was tracked and needs to be implemented. If so, the method 500 returns to block 525. Otherwise, the method 500 terminates at block 540.

Figure 6:
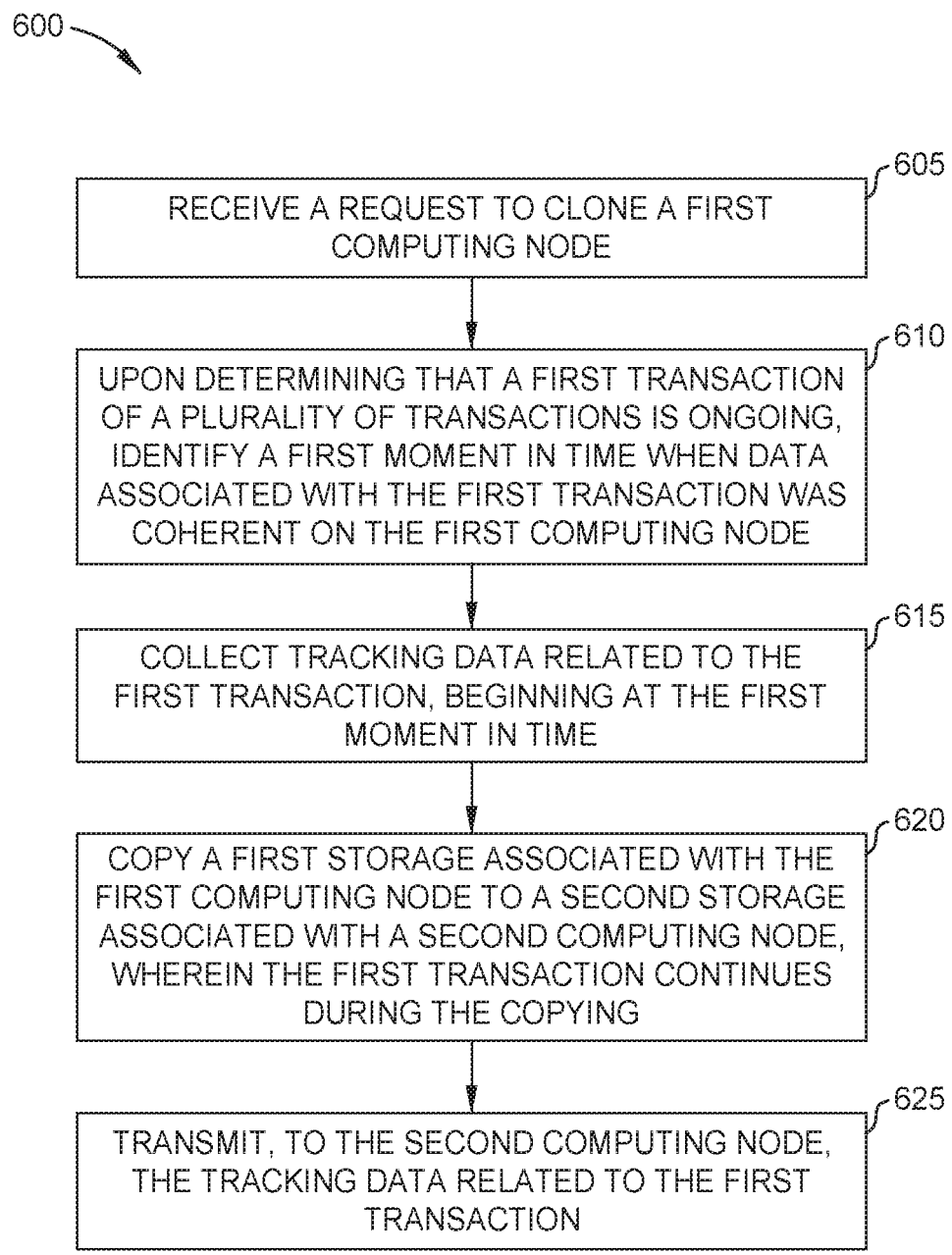
FIG. 6 is a flow diagram illustrating a method of cloning an active node, according to one embodiment disclosed herein.

FIG. 6 is a flow diagram illustrating a method 600 of cloning an active node, according to one embodiment disclosed herein. The method 600 begins at block 605, where a first computing node receives a request to clone the first computing node. At block 610, upon determining that a first transaction of a plurality of transactions is ongoing, the first computing node identifies a first moment in time when data associated with the first transaction was coherent on the first computing node. The method 600 then continues to block 615, where the first computing node collects tracking data related to the first transaction, beginning at the first moment in time. Further, at block 620, the first computing node copies a first storage associated with the first computing node to a second storage associated with a second computing node, wherein the first transaction continues during the copying. The method 600 then continues to block 625, where the first computing node transmits, to the second computing node, the tracking data related to the first transaction.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the preceding features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., the Clone Application 330) or related data available in the cloud. For example, the Clone Application 330 could execute on a computing system in the cloud and generate clones of computing nodes (e.g., virtual machines). In such a case, the Clone Application 330 could monitor ongoing transactions, and store collected tracking data at a storage location in the cloud. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A method comprising:
   receiving a request to clone a first computing node;
   in response to determining that a first transaction of a plurality of transactions is ongoing:
      identifying a first moment in time when data associated with the first transaction was coherent on the first computing node, based on determining a most recent time that the data associated with the first transaction was not dependent on data in a volatile location on the first computing node; and
      collecting tracking data related to the first transaction, beginning at the determined first moment in time;
   copying a first storage associated with the first computing node to a second storage associated with a second computing node, wherein the first transaction continues during the copying; and
   transmitting, to the second computing node, the tracking data related to the first transaction.

2. The method of claim 1, the method further comprising:
   upon determining that a second transaction of the plurality of transactions has completed on the first computing node:
      prior to copying the first storage to the second storage, transferring data associated with the second transaction to the first storage.

3. The method of claim 2, the method further comprising:
   upon determining that the second transaction has completed:
      prior to copying the first storage to the second storage, clearing tracking data related to the second transaction.

4. The method of claim 1, wherein identifying the first moment in time when data associated with the first transaction was coherent on the first computing node comprises identifying a moment in time when the first transaction began.

5. The method of claim 1, wherein identifying the first moment in time when data associated with the first transaction was coherent on the first computing node comprises identifying a most recent moment in time when data associated with the first transaction was committed to the first storage.

6. The method of claim 1, wherein the second computing node:
   initializes using the copy of the first storage;
   identifies one or more incoherent transactions in the copy of the first storage, wherein the one or more incoherent transactions include the first transaction; and
   rolls back the first transaction on the second computing node.

7. The method of claim 6, wherein, upon receiving the tracking data related to the first transaction, the second computing node performs the first transaction using the received tracking data.

8. A computer-readable storage medium having computer-readable program code embodied therewith, the computer-readable program code executable by one or more computer processors to perform an operation comprising:
   receiving a request to clone a first computing node;
   in response to determining that a first transaction of a plurality of transactions is ongoing:
      identifying a first moment in time when data associated with the first transaction was coherent on the first computing node, based on determining a most recent time that the data associated with the first transaction was not dependent on data in a volatile location on the first computing node; and
      collecting tracking data related to the first transaction, beginning at the determined first moment in time;

copying a first storage associated with the first computing node to a second storage associated with a second computing node, wherein the first transaction continues during the copying; and transmitting, to the second computing node, the tracking data related to the first transaction.

9. The computer-readable storage medium of claim 8, the operation further comprising:

upon determining that a second transaction of the plurality of transactions has completed on the first computing node:

prior to copying the first storage to the second storage, transferring data associated with the second transaction to the first storage.

10. The computer-readable storage medium of claim 9, the operation further comprising:

upon determining that the second transaction has completed:

prior to copying the first storage to the second storage, clearing tracking data related to the second transaction.

11. The computer-readable storage medium of claim 8, wherein identifying the first moment in time when data associated with the first transaction was coherent on the first computing node comprises identifying a moment in time when the first transaction began.

12. The computer-readable storage medium of claim 8, wherein identifying the first moment in time when data associated with the first transaction was coherent on the first computing node comprises identifying a most recent moment in time when data associated with the first transaction was committed to the first storage.

13. The computer-readable storage medium of claim 8, wherein the second computing node:

initializes using the copy of the first storage;

identifies one or more incoherent transactions in the copy of the first storage, wherein the one or more incoherent transactions include the first transaction; and rolls back the first transaction on the second computing node.

14. The computer-readable storage medium of claim 13, wherein, upon receiving the tracking data related to the first transaction, the second computing node performs the first transaction using the received tracking data.

15. A system comprising:

one or more computer processors; and a memory containing a program which when executed by the one or more computer processors performs an operation, the operation comprising:

receiving a request to clone a first computing node;

in response to determining that a first transaction of a plurality of transactions is ongoing:

identifying a first moment in time when data associated with the first transaction was coherent on the first computing node, based on determining a most recent time that the data associated with the first transaction was not dependent on data in a volatile location on the first computing node; and collecting tracking data related to the first transaction, beginning at the determined first moment in time;

copying a first storage associated with the first computing node to a second storage associated with a second computing node, wherein the first transaction continues during the copying; and transmitting, to the second computing node, the tracking data related to the first transaction.

16. The system of claim 15, the operation further comprising:

upon determining that a second transaction of the plurality of transactions has completed on the first computing node:

prior to copying the first storage to the second storage, transferring data associated with the second transaction to the first storage.

17. The system of claim 16, the operation further comprising:

upon determining that the second transaction has completed:

prior to copying the first storage to the second storage, clearing tracking data related to the second transaction.

18. The system of claim 15, wherein identifying the first moment in time when data associated with the first transaction was coherent on the first computing node comprises identifying a moment in time when the first transaction began.

19. The system of claim 15, wherein identifying the first moment in time when data associated with the first transaction was coherent on the first computing node comprises identifying a most recent moment in time when data associated with the first transaction was committed to the first storage.

20. The system of claim 15, wherein the second computing node:

initializes using the copy of the first storage;

identifies one or more incoherent transactions in the copy of the first storage, wherein the one or more incoherent transactions include the first transaction;

rolls back the first transaction on the second computing node; and upon receiving the tracking data related to the first transaction, performs the first transaction using the received tracking data.

\* \* \* \* \*